United States Patent [19]

Hart

[11] Patent Number: 5,787,428
[45] Date of Patent: Jul. 28, 1998

[54] CONTROL OF DATABASE ACCESS USING SECURITY/USER TAG CORRESPONDENCE TABLE

[75] Inventor: Keith Hart, Ipswich, United Kingdom

[73] Assignee: British Telecommunications public limited company, London, England

[21] Appl. No.: 693,293

[22] PCT Filed: Feb. 14, 1995

[86] PCT No.: PCT/GB95/00305

§ 371 Date: Aug. 21, 1996

§ 102(e) Date: Aug. 21, 1996

[87] PCT Pub. No.: WO95/22792

PCT Pub. Date: Aug. 24, 1995

[30] Foreign Application Priority Data

Feb. 16, 1994 [GB] United Kingdom ............... 9402935

[51] Int. Cl.⁶ .................................................. G06F 17/30
[52] U.S. Cl. .................................... 707/9; 395/186
[58] Field of Search .................................. 707/8, 9, 186, 707/187.01, 472, 490, 491, 726; 380/3, 4, 25; 395/186

[56] References Cited

U.S. PATENT DOCUMENTS

| 5,191,611 | 3/1993 | Lang | 380/4 |
| 5,283,830 | 2/1994 | Hinsley et al. | 380/25 |
| 5,421,011 | 5/1995 | Camillone et al. | 395/67 |
| 5,446,903 | 8/1995 | Abraham et al. | 395/728 |

FOREIGN PATENT DOCUMENTS 0398645  11/1990  European Pat. Off. .

OTHER PUBLICATIONS

Lu et al., "A Model For Multilevel Security in Computer Networks", IEEE Infocom '88, 1988, pp. 1095–1104.
Vinter, "Extended Discretionary Access Controls", 1988 IEEE Symposium on Security and Privacy, pp. 39–49.

Primary Examiner—Paul Kulik
Attorney, Agent, or Firm—Nixon & Vanderhye P.C.

[57] ABSTRACT

A method and apparatus controls access to data in a database by configuring at least part of the database such that at least some of the data of the configured database is associated with a security tag, configuring a storage structure of user identifiers and associated user tags configuring a storage structure of user tags and associated security tags and mapping a user identifier to at least a sub-set of the data by determining from the storage structure of user tag and associated security tags a security tag or tags appropriate for the user tag of the user identifier and allowing access to the data from the configured database associated with the security tag or tags. By providing a storage structure of user tags and associated security tags it is possible to change the security policy by modification of the data in the storage structure alone without any need to modify the data in the configured database.

4 Claims, 6 Drawing Sheets

| EMP. No. | NAME | POSITION | SAL | DEPT. | ROW_TAG |
|----------|------|----------|-----|-------|---------|
| 33a | 33b | 33c | 33d | 33e | 33f |

EMPLOY TABLE 33

Fig.5.

| ROW_TAG | USER_TAG |
|---------|----------|
| 34a | 34b |

SECURITY TABLE 34

Fig.6.

| USER_TAG | USER_NAME |
|---|---|
| 35a | 35b |

USER TABLE

CONTROL OF DATABASE ACCESS USING SECURITY/USER TAG CORRESPONDENCE TABLE

BACKGROUND OF THE INVENTION

1. Field of the Invention

This invention relates to a method and apparatus for controlling access to a database.

2. Related Art

In database systems it is usual for a number of users to be able to interact with the system and to utilise the database. Such systems are thus called multi-user systems. A problem occurs in such systems, where the database contains information or data which is in some way sensitive, that is to say, it should only be available for a certain user or a member of a certain class of user. Where this is so, a security policy is implemented to restrict the data available to the class of user.

An example of a database management system which supports multiple users is ORACLE (registered trademark of Oracle Corporation). ORACLE is a relational database management system. In a relational database, only one type of data structure exists and this is the table which is a two dimensional structure of rows and columns of data. A query language called Structured Query Language (SQL) may be used to access data in a database in a non-procedural way.

There are a number of ways in which a security policy has been implemented on database management systems. For example, in one method each class of user is provided with its own copy of that part of the data held in the central database for which it is appropriate for that group to have access to. This method has been called the replication method because it results in the data being replicated since at least some of the data will exist in more than one copy. Clearly, such a method is very inefficient in terms of memory usage. Further, if one copy of the data is changed in some way by, for example, a user of a particular group updating a value, then a number of other copies of that data held by other groups will have to be updated. This will be time consuming and the way in which the system is administered will have to be very precise to ensure that data is maintained in a consistent state if, for example, the system crashes.

In EP-A-0 398 645 there is described a system for controlling access privileges to an object-oriented database. In this system, each user is assigned a user identity and a set of group identities. Each object has an access list which provides access permissions. Each access control list has seven user or group identities.

SUMMARY OF THE INVENTION

According to one aspect of the present invention, there is provided a method of controlling access by a user to a database which comprises a set of data divided into sub-sets of data, said method comprising the steps of: assigning a single security tag to each sub-set of data in at least some of said sub-sets of data, assigning a user tag to an identifier for each user in a user table, assigning at least one security tag to each user tag in a security table, utilising the user table to obtain the user tag for the user, utilising the security table to obtain at least one security tag corresponding to the user tag, and permitting the user to access any sub-set of data having said at least one security tag.

With the present invention, it is possible to change the security policy by modification of the value in the security table alone without any need to reconfigure the database or to change the user tag associated with the user identifiers. A security tag may be a number or a character or other data entry.

With the method of this invention, a database has to have one copy only of the data which is shared by the users. This avoids at least some of the problems associated with the known replication methods. It should be noted that not all of the database needs to be configured for the sake of security. Some parts may be public and thus open to all users.

According to another aspect of this invention, there is provided an apparatus for controlling access by a user to a database divided into sub-sets of data, said apparatus comprising means for assigning a single security tag to each sub-set of data in at least some of said sub-sets of data, means for assigning a user tag to an identifier for each user in a user table, means for assigning at least one security tag to each user tag in a security table, means for utilising the user table to obtain the user tag for a user, means for utilising the security table to obtain at least one security tag corresponding to a user tag, and means for permitting a user to access any sub-set of data having said at least one security tag.

BRIEF DESCRIPTION OF THE DRAWINGS

A specific embodiment of the invention will now be described, by way of example only, with reference to the drawing in which.

DETAILED DESCRIPTION OF EXEMPLARY EMBODIMENTS

Figure 1:
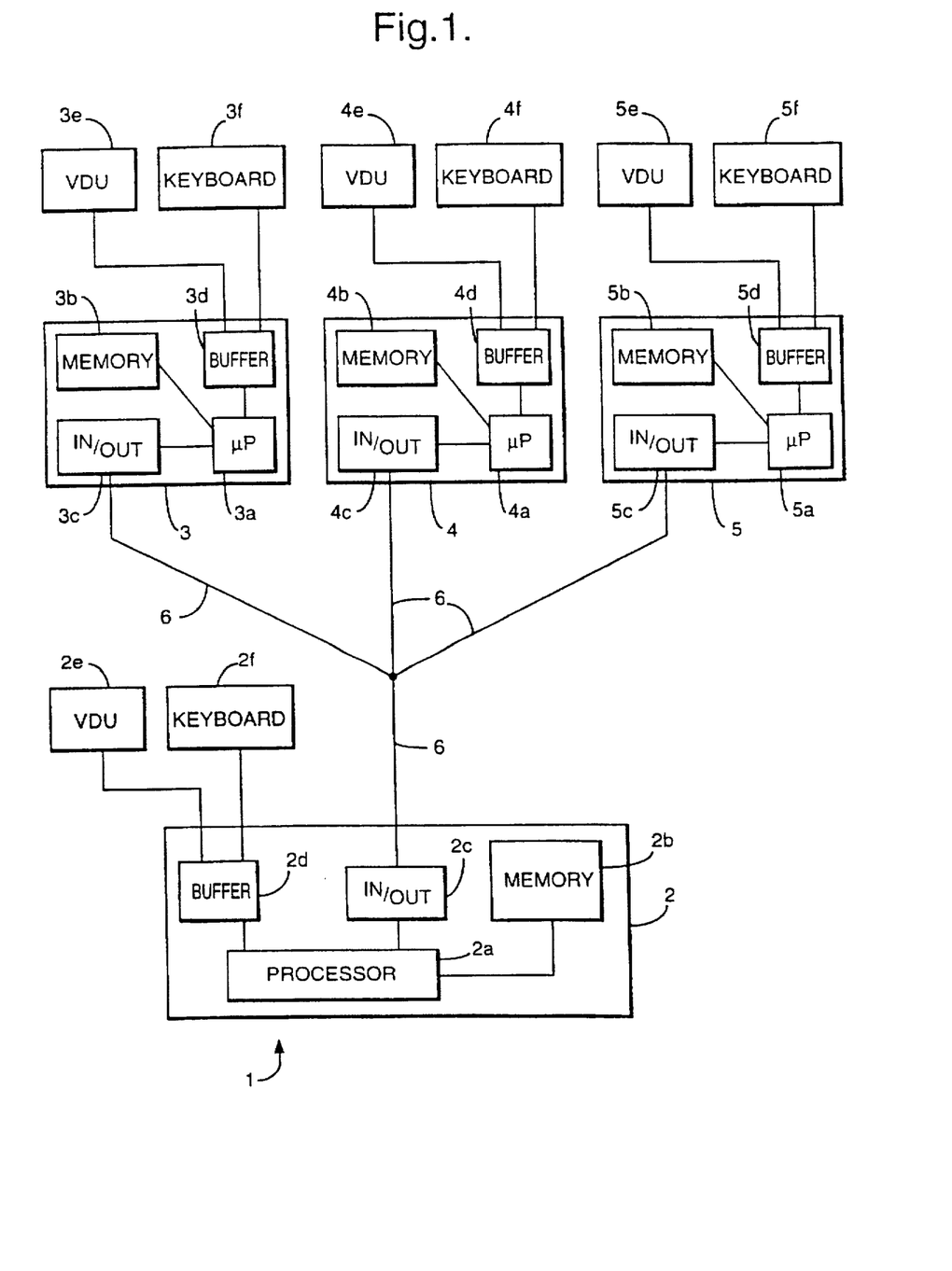
FIG. 1 shows, in schematic block diagram form, hardware of a database system operating in accordance with an embodiment of the invention.

With reference to FIG. 1, a database system 1 comprises a number of elements including a mainframe computer 2 of well known type such as a DEC Micro Vax connected to a number of user terminals 3, 4 and 5 each of which comprises a microcomputer of well known type such as an IBM PC. The connection is made by means of coaxial cable 6 of well known type and the communication between the elements of the system 1 is achieved by a well known communications protocol such as Transmission Control Protocol/Internet Protocol (TCP/IP).

The user terminals 3, 4 and 5 are nominally identical. Each has a microprocessor 3a, 4a and 5a; memory 3b, 4b and 5b; an input/output device 3c, 4c and 5c; a buffer 3d, 4d and 5d; a visual display unit (VDU) 3e, 4e and 5e, and a keyboard 3f, 4f and 5f.

As will be readily appreciated, the memory 3b, 4b and 5b can be in the form of random access memory, read only memory or combinations of the both. The memory may be of solid state form as semiconductor "chips" or disc (optical or magnetic) or a combination of these forms.

Whatever the form, the memory comprises a number of memory locations. These locations will contain instructions for governing the operation of the microprocessor 3a, 4a and 5a with which the particular memory is associated. The microprocessor 3a, 4a and 5a accesses the memory to obtain the instructions. A program for governing the operation of the terminal is held in the memory as a set of instructions located at a number of the memory locations. The instructions will be in the form of a hexadecimal number.

The memory is linked to the microprocessor by a databus in a manner well known. The databus also links the microprocessor to the other elements of the terminal. The input/output device 3c, 4c and 5c acts as an interface between the terminal and the other computers in the system.

The keyboard and VDU of each terminal interacts with the terminal's microprocessor via the buffer in a well known manner. Collectively, they provide an interface between the system and a user wishing to interact with the system.

The main frame computer 2 has a processor 2a, memory 2b, an input/output device 2c, a peripheral buffer 2d and associated VDU 2e and keyboard 2f. Thus, it will be seen that the mainframe computer 2 is of the same form as the user terminals 3, 4 and 5. The major difference is that the storage capacity of the memory 2b is far greater than that of the memory of the user terminals. An administrator of the database system can access the system by utilising the keyboard 2f and VDU 2e.

The terminals 3, 4 and 5 and the mainframe computer 2 are interconnected by the coaxial cable 6 which extends between the input/output devices 3c, 4c and 5c of the terminals and the input/output device 2c of the mainframe. As earlier mentioned a protocol called TCP/IP is used for communication between elements of the system 1.

The memory 2b contains a database of information. This information can be accessed by the users from their terminals. However the extent to which each user is allowed to access the information may vary between users. The system administrator will have access to all the database.

Figures 2, 3:
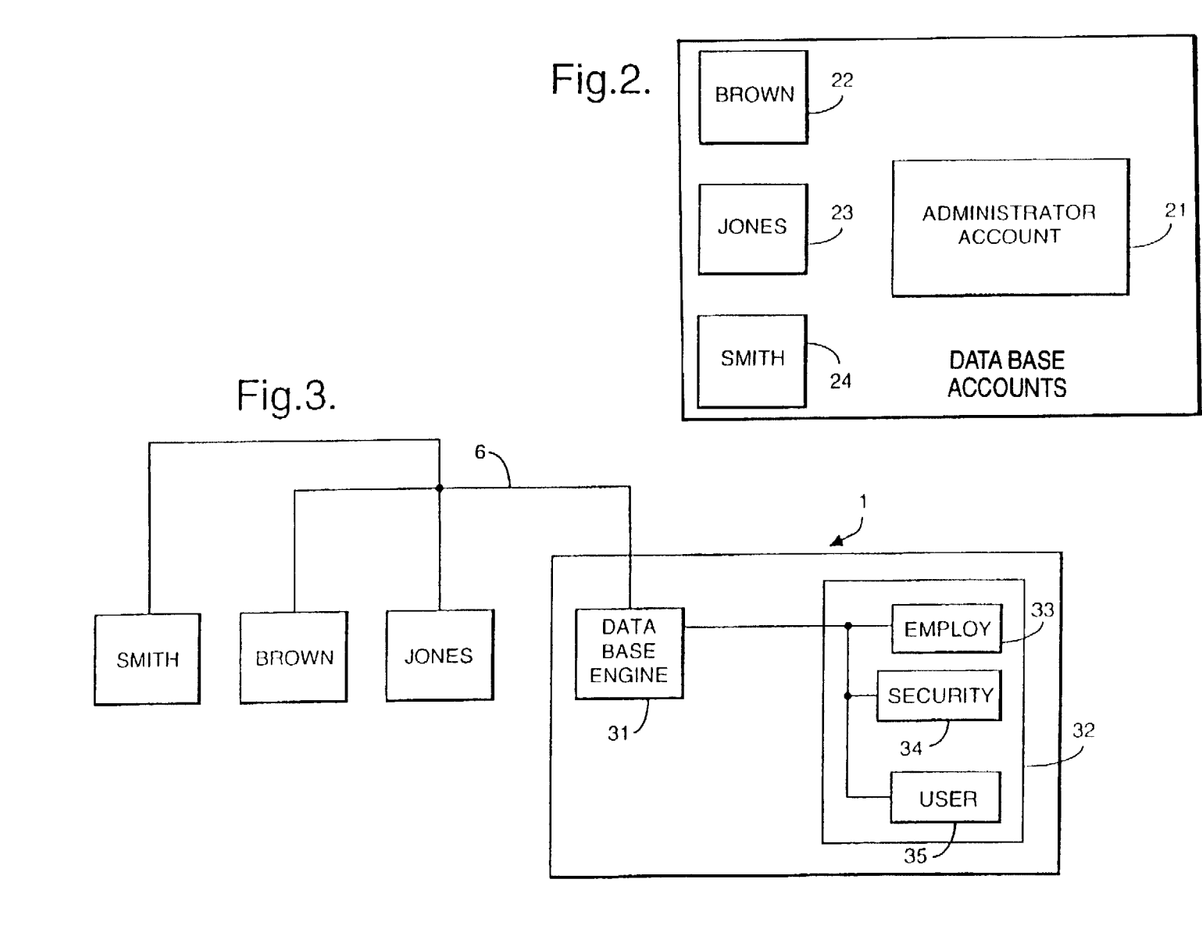
FIG. 2 shows a set of database accounts supported by the database system.
FIG. 3 shows a software view of the database system.

The system can be considered as providing a set of database accounts, as depicted in FIG. 2. The administrator will have an administrator account 21 and the users will have user accounts 22, 23 and 24. In this case the users are named Brown, Smith and Jones and the accounts are labelled accordingly.

The memory 2b holds, as well as the database, a program for controlling the processor 2a, in particular, the way in which the database is accessed by each of the users. Thus, under software control the processor 2a acts as a database engine.

As is shown in FIG. 3, Smith, Brown and Jones can input requests into the database engine 31 and the engine will process the request accessing the database 32 as required. The database engine 31 then outputs a response to the querying user. These requests will be carried by transmission over the coaxial cable 6.

The database 32 is subdivided into three parts, each part being an SQL table. The first subdivision is a table 33 called "EMPLOY". The second subdivision is a table 34 called "SECURITY" and the third subdivision is a table 35 called "USER". The database system 1 utilises a programming language called ORACLE SQL (registered trade mark of the Oracle Corporation) to set up and utilise the tables. The way in which the tables are initially created will be described later.

Figure 4:
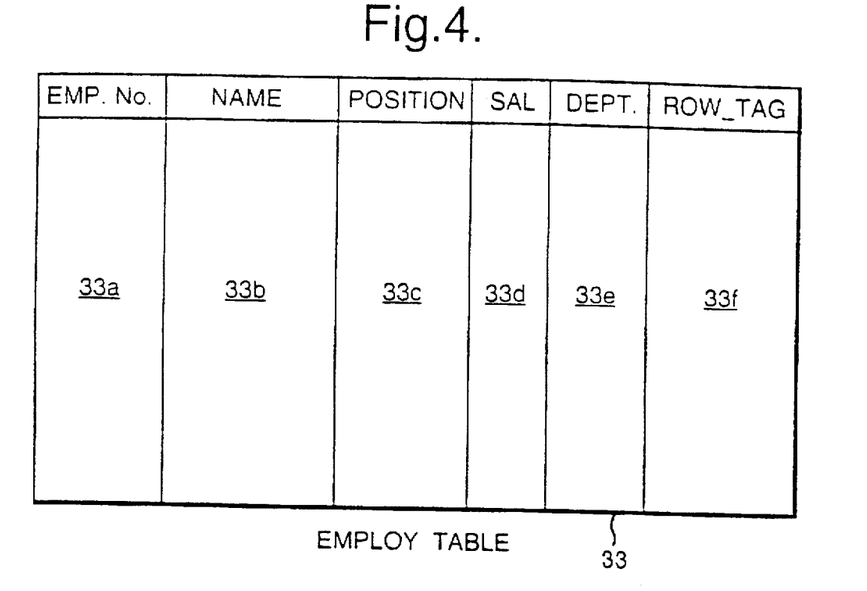
FIGS. 4 to 6 show, in schematic form, tables used in the database system.

The "EMPLOY" table 33 comprises information about employees in a company. It comprises a number of datafields as shown in FIG. 4.

The datafields include a datafield 33a called "EMP NO" which includes the employee reference numbers for the employees of a particular company.

There is a datafield 33b called "NAME" which includes the names of employees of the company held as a string of thirty characters (CHAR) or less.

The next datafield is a datafield 33c which is called "POSITION". The "POSITION" datafield 33c contains information about the position of a particular employee in the company, for example, the employee may be a manager, clerk or secretary. This information is also stored as a string of ten characters or less.

The next datafield is datafield 33d and this is called "SAL". This contains information about each employees salary expressed numerically in seven digits.

Datafield 33e is called "DEPT" and this includes the name of the department within which the employees work. This information is held as a string of ten characters.

Datafield 33f is called "ROW_TAG". This datafield contains a one character string indicative of a security status of the row of information to which it belongs. This field is of particular significance to the way in which access is allowed to particular rows of the "EMPLOY" table 33.

Figure 5:
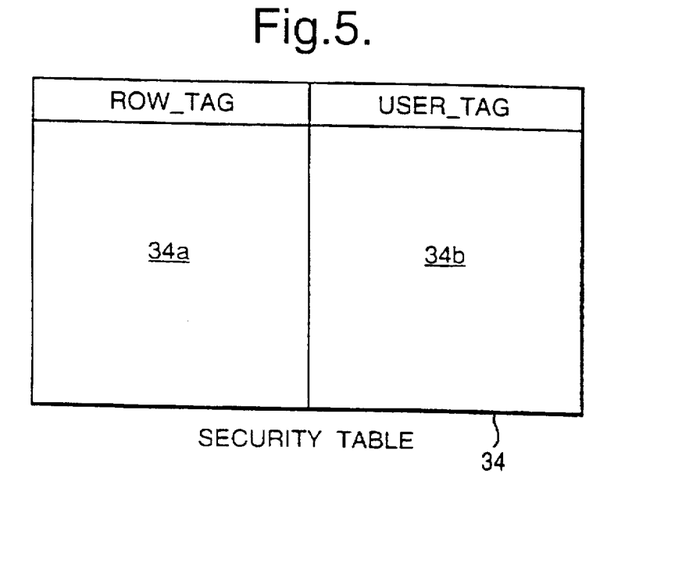

The "SECURITY" table 34 comprises two datafields, a first datafield 34a called "ROW_TAG" and a second datafield 34b called "USER_TAG", as shown in FIG. 5.

The "ROW_TAG" datafield 34a will include the same characters as held in the "ROW_TAG" datafield 33f of the "EMPLOY" table. This will permit a mapping operation to be explained later in which rows of the "EMPLOY" table are selected by selecting these rows having a "ROW_TAG" the same as the "ROW_TAG" of the "SECURITY" table 34.

The "USER_TAG" datafield 34b holds one character data. The function of this field is to enable the mapping operation mentioned above and this will be more fully explained later.

The "SECURITY" table 34 is thus named because the system security policy is embodied in the table. The "ROW_TAG" and "USER_TAG" of this table are termed security tags since the security policy is governed by these tags. The security policy may be conveniently modified by modifying this table. This aspect of the system will be more fully explained later.

Figure 6:
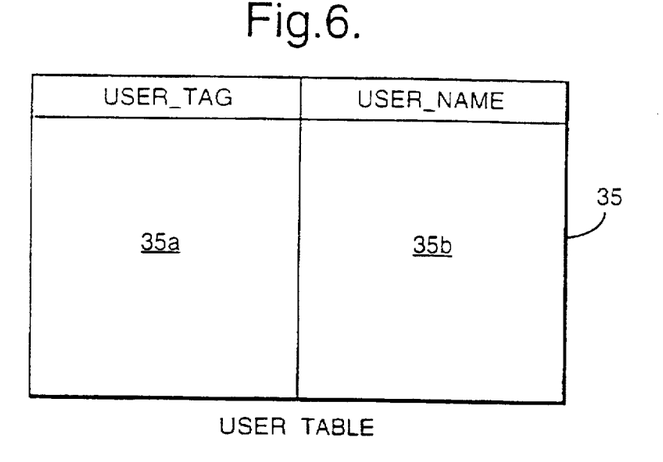

The "USER" table 35 is shown in FIG. 6 and comprises a "USER_TAG" field 35a and a "USER_NAME" field 35b.

The "USER_TAG" field 35a holds one character data which will include the same characters as those held in the "USER_TAG" field 34b of the "SECURITY" table 34. This will permit the aforementioned mapping operation to be performed as will be described later.

The "USER_NAME" field 35b holds the names of users of the system in the form of character strings.

Figure 7:
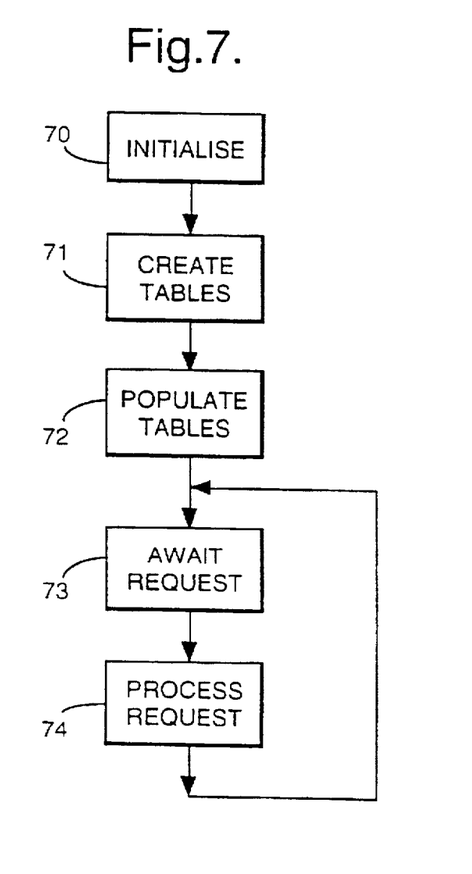
FIG. 7 is an explanatory diagram of operation of the database system.

A flow chart of the system operation is shown in FIG. 7. A first step in the operation is initialisation, as represented by box 70. In this step the terminals 3, 4 and 5 are switched on, as is the main computer 2, and readied for use.

A second step, as represented by box 71, is to create the tables in memory 2b. This is done by the database engine 31 using a SQL command CREATE TABLE in the following way.

For the "EMPLOY" table 33 the following command statement is implemented by the database engine 31:

```
CREATE TABLE EMPLOY
(
EMP NUMBER (4)
NAME        CHAR (30),
POSITION    CHAR (10),
SAL         NUMBER (7),
DEPT        CHAR(10),
ROW_TAG     CHAR(1)
);
```
The "SECURITY" table 34 is configured by use of the SQL CREATE TABLE command in the following way.
```
CREATE TABLE SECURITY
(ROW_TAG CHAR (1),
USER_TAG CHAR (1)
);
```
The "USER" table 35 is configured, by the SQL CREATE COMMAND in the following way.
```
CREATE TABLE USER
(
USER_TAG CHAR (1),
USER_NAME CHAR (10)
);
```

In a next step 72 the tables are populated with data. This is done by the network administrator utilising the database engine 31 and the SQL INSERT command in the following way.

For example to insert a row of data about an employee called Stuart Fitchett into the "EMPLOY" table the following command is issued by the administrator.

INSERT INTO EMPLOY

VALUES (10, 'Stuart Fitchett', 'CLERK', 1000, 'CS', 'U');

Thus, it is recorded that employee number 10 is called Fitchett, he is a clerk earning £1000 per month in the customer services department (abbreviated CS) and the security tag required to read this information is 'U'.

Data is entered into the "SECURITY" table 34 in a similar way. For example the first seven rows of data may be entered in the following manner.

INSERT INTO SECURITY

VALUES ('U', 'A');

INSERT INTO SECURITY

VALUES ('V,' 'A');

INSERT INTO SECURITY

VALUES ('U,' 'B');

INSERT INTO SECURITY

VALUES ('W' 'B');

INSERT INTO SECURITY

VALUES ('W' 'C');

The USER table is completed in a similar manner.

INSERT INTO USER

VALUES ('A', 'SMITH');

INSERT INTO USER

VALUES ('B', 'JONES');

INSERT INTO USER

VALUES ('C', 'BROWN');

The database engine 31 then awaits a request from one of the users for information from the database 32 as represented by box 73 of FIG. 7.

When a request is received it is processed, as represented by box 74. Upon completion of the processing the system returns to the await request step 73.

Figure 8:
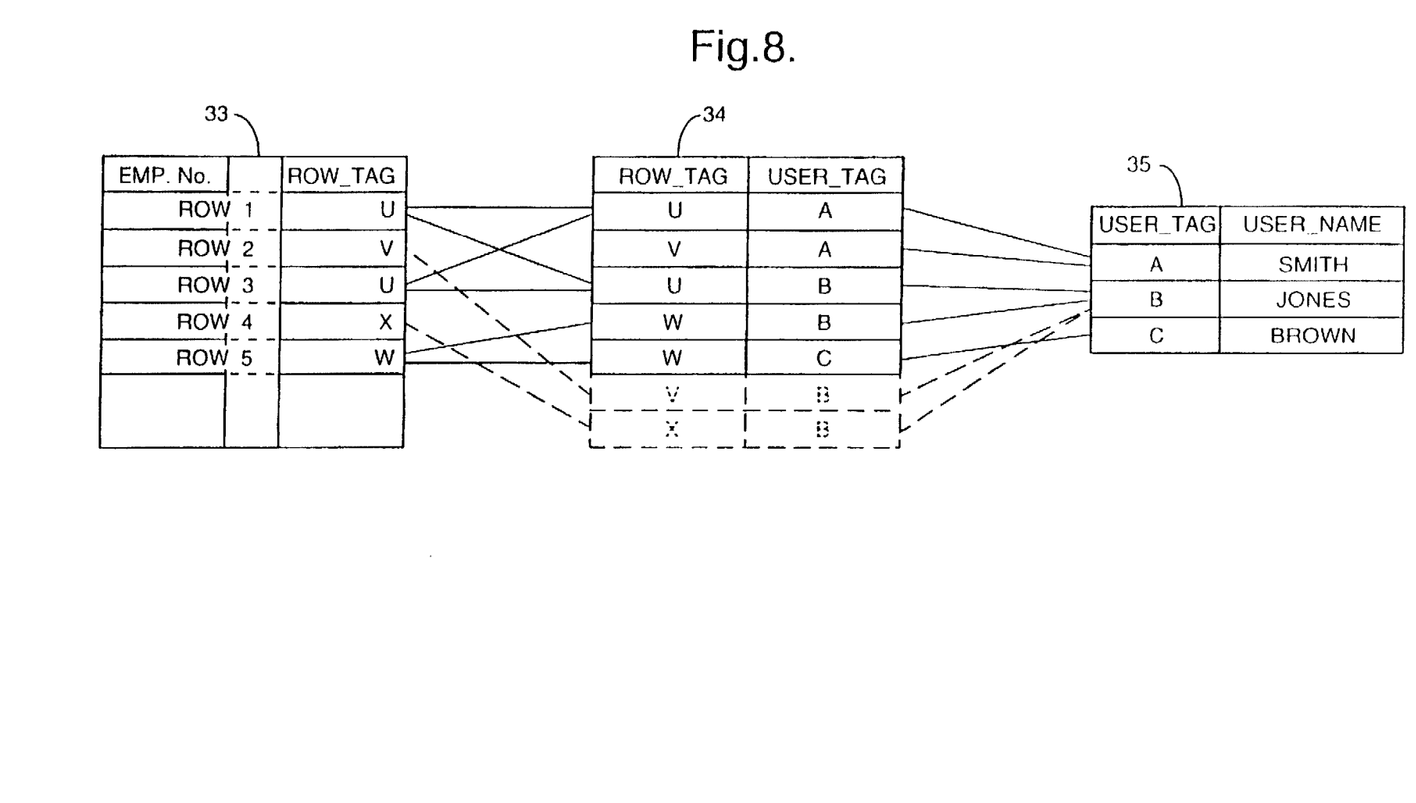
FIG. 8 is an explanatory diagram of a mapping operation carried out by the database system.

The completed tables are schematically shown in FIG. 8.

The process request step 74 will now be described in more detail with reference to FIG. 9. It is this processing step that utilises the above mentioned mapping operation that implements the security policy governing the system 1.

Figure 9:
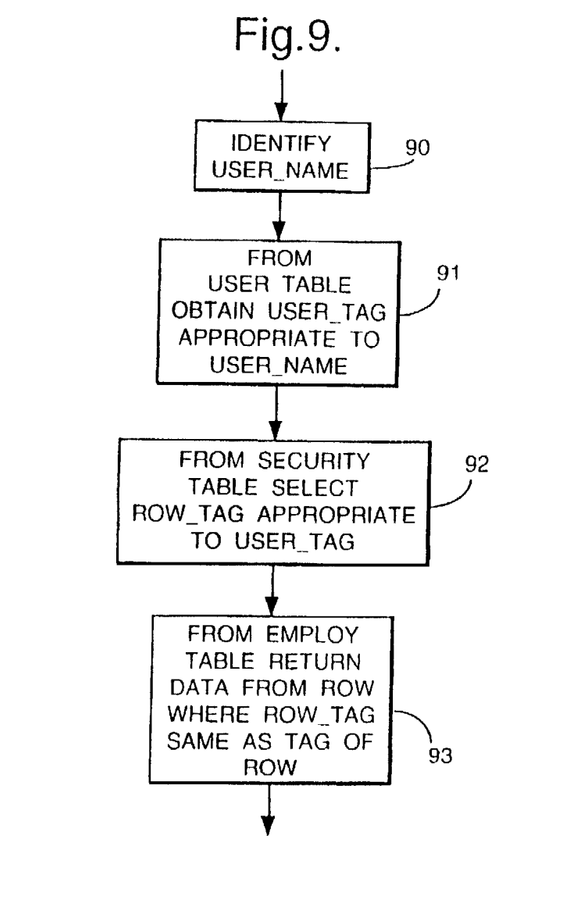
FIG. 9 is a further explanatory diagram showing steps in the mapping operation.

A first step is for the database engine 31 to identify the user making the request for access to information stored in the database 32, as represented by box 90 of FIG. 9.

A next step is for the database engine 31 to utilise the "USER_TABLE" 35 to obtain a "USER_TAG" appropriate for the identified user, as represented by box 91.

A further step, as represented by box 92, is for the database engine 31 to utilise the "SECURITY" table 34 to obtain a "ROW_TAG" appropriate for the "USER_TAG" identified in step 91.

A final step, as represented by box 93, is for the database engine 31 to return from the "EMPLOY" table 33 a row or rows of data where a "ROW_TAG" associated with the row matches the "ROW_TAG" identified in the previous step, step 92.

An example will now be used to illustrate the way in which the database engine 31 processes a request.

A user having a USER_NAME SMITH has been assigned a USER_TAG A and this may be mapped via the "SECURITY" table 34 to ROW_TAGS U and V. This enables SMITH to gain access to rows of the EMPLOY table 33 which have been assigned ROW_TAGS U or V. Thus SMITH is mapped onto rows ROW1, ROW2 and ROW3 of table EMPLOY and can view the data of those rows.

In more detail, suppose SMITH wishes to access all the information that he can from the "EMPLOY" table 33. To do this SMITH sends a SQL SELECT command SELECT * FROM EMPLOY; to the database engine 31.

The database engine 31 attributes an argument to this command of SMITH to identify the user and then performs the following mapping operation where USER_NAME is "SMITH". The mapping operation being provided in the programme governing the operation of the database engine 31.

```
CREATE VIEW SECURE_EMPLOY AS
SELECT    EMP,
          NAME,
          POSITION,
          SAL,
          DEPT,
FROM EMPLOY
WHERE EMPLOY.ROW_TAG IN
(
          SELECT SECURITY.ROW_TAG
          FROM SECURITY
          WHERE SECURITY.USER_TAG IN
          (
          SELECT USER.USER_TAG
          FROM USER
          WHERE USER.USER_NAME = username
          )
)
```

This returns to the user SMITH the rows of table "EMPLOY" which have a ROW_TAG 'U' or 'V' that is to say rows ROW 1, ROW 2 and ROW 3 of the table 33. It should be noted that since the SELECT command did not include the "ROW_TAG" column of the "EMPLOY" table 33 this information is not returned to the user and the security policy governing the data cannot be determined by the user. Thus, the security policy is transparent to the user.

The system caters for access by BROWN and JONES in a similar way with the user name argument attributed by the database engine being BROWN or JONES as appropriate.

If a change in the security policy is to be implemented, for example, the class of user having a USER_TAG of 'A'. formerly having access to rows in the EMPLOY table 33 having TAG 'U' or 'V', is to be restricted to only rows having TAG 'U', then it is only necessary for the network administrator to amend the SECURITY table 34 by deleting from the security tags assigned to user tag A. This could be achieved by using the SQL DELETE FROM table command thus:

DELETE FROM SECURITY
WHERE SECURITY.USER_TAG='A'
AND SECURITY.ROW_TAG='V';

Thus the second row of the "SECURITY" table 34 as shown in FIG. 8 is deleted, eliminating that mapping path from user SMITH to the second row of the "EMPLOY" table 6 having "TAG" 'V'.

To extend the amount of the EMPLOY table 33 accessible to a class of user having a USER_TAG 'B', for example, to enable rows having a ROW_TAG 'V' or ROW_TAG 'X' to be accessed, the SQL command INSERT INTO table is used thus:

INSERT INTO SECURITY
VALUES ('V', 'B');
INSERT INTO SECURITY
VALUES ('X', 'B');

This will provide the two further mapping paths from the user table to the EMPLOY table as shown in broken outline in FIG. 8.

In some database security systems it will be desirable to prevent data being updated in the database by some classes of users. One way in which this may be achieved is creating a view onto the EMPLOY table 33 which is secure in the sense of a check option being provided to prevent a user inserting an entry into a part of the database which he cannot subsequently delete information from. Insertion of data or updates of data are only allowed if a SQL "WHERE" statement is satisfied. For example:

```
CREATE VIEW SECURE EMPLOY_2 AS
SELECT*
FROM EMPLOY
WHERE EMPLOY.ROW_TAG IN
(
    SELECT SECURITY.ROW_TAG
    FROM SECURITY
    WHERE SECURITY.USER_TAG IN
    (
    SELECT USER.USER_TAG
    FROM USER
    WHERE USER.USER_NAME = USERNAME
    )
)
WITH CHECK OPTION
```

In the first described embodiment the database contained information about employees that is to say the database was a personnel database. Other types of information could be stored.

Figure 10:
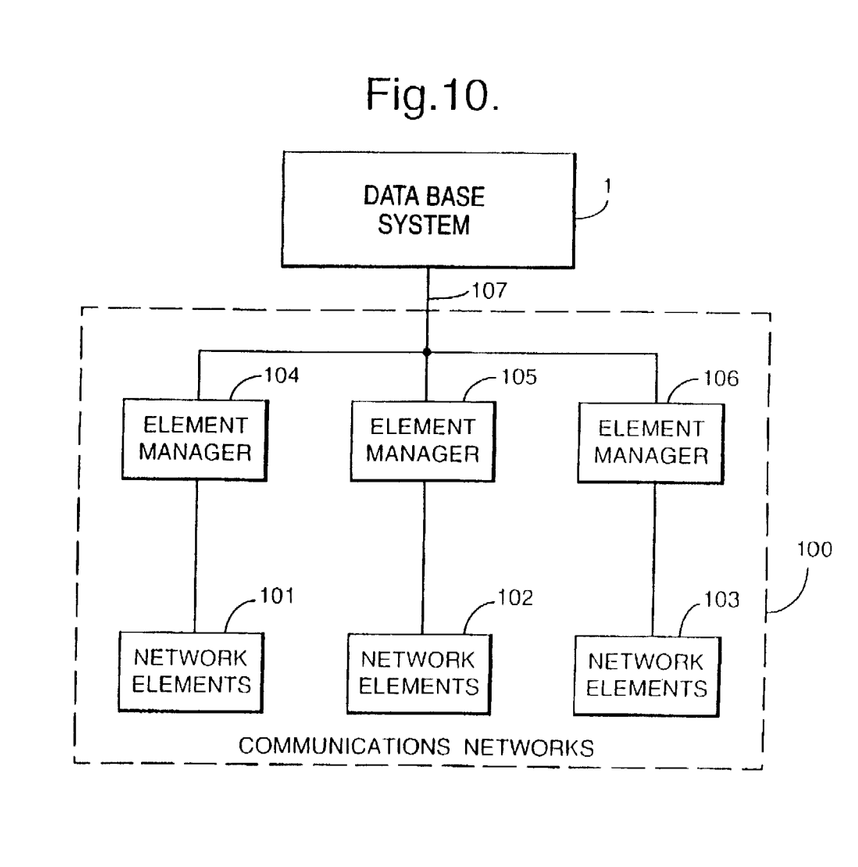
FIG. 10 shows in schematic block diagram form the database system being used in a network management application.

FIG. 10 shows a system 1 in accordance with the invention, being used in a network manager. In this system the database includes information such as configuration management information on a telecommunications network 100 comprising a number of network elements 101 to 103 and their element managers 104 to 106. Users of the system 1, such as network managers concerned with the operation and control of the network 100, can then be provided with access to different parts of the database in the same way as earlier described.

What is claimed is:

1. A method of controlling access by a user to a database which comprises a set of data divided into sub-sets of data, said method comprising the steps of:

assigning a single security tag to each sub-set of data in at least some of said sub-sets of data, assigning a user tag to an identifier for each user in a user table, assigning at least one security tag to each user tag in a security table, utilising the user table to obtain the user tag for the user, utilising the security table to obtain at least one security tag corresponding to the user tag, and permitting the user to access any sub-set of data having said at least one security tag.

2. A method of controlling access by a user to a database as in claim 1 in which the database is a rational database having rows of data, each row of data forming a sub-set of data.

3. An apparatus for controlling access by a user to a database divided into sub-sets of data, said apparatus comprising:

means for assigning a single security tag to each sub-set of data in at least some of said sub-sets of data, means for assigning a user tag to an identifier for each user in a user table, means for assigning at least one security tag to each user tag in a security table, means for utilising the user table to obtain the user tag for a user, means for utilising the security table to obtain at least one security tag corresponding to a user tag, and means for permitting a user to access any sub-set of data having said at least one security tag.

4. An apparatus for controlling access by a user to a database as in claim 3 in which the database is a relational database having rows of data, each row of data forming a sub-set of data.

* * * * *